(12) United States Patent
Tamura

(10) Patent No.: US 7,010,513 B2
(45) Date of Patent: Mar. 7, 2006

(54) SOFTWARE ENGINE FOR MULTIPLE, PARALLEL PROCESSING WITH NEURAL NETWORKS

(76) Inventor: Raymond M. Tamura, 1414 Alexander St. Apartment 204, Honolulu, HI (US) 96822

( * ) Notice: Subject to any disclaimer, the term of this patent is extended or adjusted under 35 U.S.C. 154(b) by 348 days.

(21) Appl. No.: 10/602,627

(22) Filed: Jun. 25, 2003

(65) Prior Publication Data
US 2005/0090908 A1    Apr. 28, 2005

Related U.S. Application Data

(60) Provisional application No. 60/462,323, filed on Apr. 14, 2003.

(51) Int. Cl.
G06F 15/18    (2006.01)
G05B 19/18    (2006.01)

(52) U.S. Cl. .............................. 706/15; 706/26; 706/27; 700/4

(58) Field of Classification Search .................. 706/15, 706/26–27, 4; 700/4
See application file for complete search history.

(56) References Cited

U.S. PATENT DOCUMENTS

| | | | | |
|---|---|---|---|---|
| 5,454,064 A | * | 9/1995 | Castelaz | 706/18 |
| 5,768,476 A | * | 6/1998 | Sugaya et al. | 706/26 |
| 5,826,249 A | * | 10/1998 | Skeirik | 706/25 |
| 2003/0055798 A1 | * | 3/2003 | Hittle et al. | 706/15 |
| 2003/0074338 A1 | * | 4/2003 | Young et al. | 706/15 |

OTHER PUBLICATIONS

Neural network techniques for object orientation detection. Solution by optimal feedforward network and learning vector quantization approaches Morris, R.J.T.; Rubin, L.D.; Tirri, H.; Pattern Analysis and Machine Intelligence, IEEE, 1990, pps. 1107-1115.*

Joint solution of low, intermediate, and high-level vision tasks by evolutionary optimization: Application to computer vision at low SNR Bhattacharjya, A.K.; Roysam, B.; Neural Networks, IEEE, 1994, Digital Object Identifier 10.1109/34.61712, pps. 83-95.*

A parallel hybrid genetic algorithm simulated annealing approach to finding most probable explanations on Bayesian belief networks Abdelbar, A.M.; Hedetniemi, S.M.; Neural Networks, 1997, Digital Object Identifier 10.1109/ICNN, pps. 450-455.*

Bayesian case-based reasoning with neural networks Myllymaki, P.; Tirri, H.; Neural Networks, 1993., IEEE International Conference, 1993 pp.: 422-427 vol. 1 Digital Object Identifier 10.1109/ICNN. 1993.298594.*

Tamura, R.M.; *Innovative Approach to Predictive Utilization of Medical Services*; Proceedings of 6th Hawaii International Conference on Systems Sciences; Jan. 1973.

(Continued)

*Primary Examiner*—Wilbert L. Starks, Jr.
*Assistant Examiner*—Michael B. Holmes
(74) *Attorney, Agent, or Firm*—James Creighton Wray; Meera P. Narasimhan

(57) ABSTRACT

The hardware of the present invention must be structured with the Brownian motion equation, Bayes' equation and its matrices as integral components. All data are input to a common bus bar. All data are then sent to all nodes simultaneously. Each node will have coded gates to admit the proper data to the appropriate matrix and Bayes' equation. Then, as the data are processed, they will be sent to a central data processing unit that integrates the data in the Brownian motion equation. The output is displayed in linguistic terms or in digital form by means of fuzzy logic.

21 Claims, 5 Drawing Sheets

OTHER PUBLICATIONS

Tamura, R.M.; *Use of Veitch-Karnaugh Mapping in Management*; Proceedings of 11th Hawaii International Conference on Systems Sciences: vol. II, pp 168-178; Jan. 5-6, 1978.

Tamura, R.M.; *User's View of Linear and Non-linear Medical Models*; Proceedings of Nueroequilobiometric Society Conference, Bad Kissengen, FRG; 1982.

* cited by examiner

Figure 3

$$\begin{vmatrix} z_{11} & \cdots & z_{v1} \\ \vdots & & \vdots \\ z_{1w} & \cdots & z_{vw} \end{vmatrix} + \begin{vmatrix} Y_{11} & \cdots & Y_{v1} \\ \vdots & & \vdots \\ Y_{1w} & \cdots & Y_{vw} \end{vmatrix} + \begin{vmatrix} k_{11} & \cdots & K_{v1} \\ \vdots & & \vdots \\ K'_{1w} & \cdots & K_{vw} \end{vmatrix} + \cdots$$

Physiologic     Pathologic     Psychologic $$\begin{vmatrix} U_{11} & \cdots & U_{v1} \\ \vdots & & \vdots \\ U_{1w} & \cdots & U_{vw} \end{vmatrix} + \begin{vmatrix} S_{11} & \cdots & S_{v1} \\ \vdots & & \vdots \\ S_{1w} & \cdots & S_{vw} \end{vmatrix} + \begin{vmatrix} R_{11} & \cdots & R_{v1} \\ \vdots & & \vdots \\ R'_{1w} & \cdots & R_{vw} \end{vmatrix} + \cdots$$

Interpersonal     Socioeconomic     Marital m = internal parameters n = external parameters $f = \bar{x}_1 \bar{x}_3 \bar{x}_5 \vee x_1 x_3 x_5 \vee \bar{x}_3 x_4 \bar{x}_5 x_6$

SOFTWARE ENGINE FOR MULTIPLE, PARALLEL PROCESSING WITH NEURAL NETWORKS

This application claims the benefit of U.S. Provisional Application No. 60/462,323, filed Apr. 14, 2003.

BACKGROUND OF THE INVENTION

Many fields dealing with research or other endeavors require the use and manipulation of huge data arrays. All fields that need to solve and predict problems and solutions need methods of handling large data arrays. Current methods of dealing with large data arrays are inadequate to properly consider and integrate data from the real world.

Past and present machines are deficient because the software for these processes is sequential. Sequential processes are not able to handle the huge data arrays of randomness found in the real world. Additionally, current machines are not able to communicate with one another in order to upgrade information.

Current machines are also not able to solve problems or predict problems and solutions in tiered structures.

Needs exist for improved methods for integrating data into large data arrays and predicting and solving problems using these data arrays.

SUMMARY OF THE INVENTION

The present invention is a method for handling large data arrays that incorporates data from the past and present in many fields and integrates this data for a solution. The present invention can handle most software. It is possible to incorporate the ubiquitous randomness in the real world and integrate data from the laboratory and academic worlds. Formulae for accomplishing this integration are located in the chips as integral parts. The chips communicate with each other in a neural network.

The present software engine is unique in that it is designed to deal with real world events in any time interval, and predict events in succeeding time intervals. Another unique feature is that the software and hardware elements are designed as integral entities. This is different from all other computer systems where software and hardware are designed as separate entities, generally by separate companies.

The Brownian motion equation is used to deal with real world, random events and to predict succeeding events. This equation is divided into two vectors. Each vector is a sum of a series of matrices that approaches infinity to avoid the problem of coping with random events by using deterministic functions and methods. Elements of each matrix are a Bayes' equation.

A vector is equal to the sum of all the matrices that represent the various components of the entity. One of the two vectors can be designated by the user to represent the vector on which external forces are acting. The other vector represents forces acting on the entity internally.

The hardware of the present invention must be structured with the Brownian motion equation, Bayes' equation and its matrices as integral components. All data are input to a common bus bar. All data are then sent to all nodes simultaneously. Each node will have coded gates to admit the proper data to the appropriate matrix and Bayes' equation. Then, as the data are processed, they will be sent to a central data processing unit that integrates the data in the Brownian motion equation. The output is displayed in linguistic terms or in digital form by means of fuzzy logic.

These and further and other objects and features of the invention are apparent in the disclosure, which includes the above and ongoing written specification, with the drawings.

BRIEF DESCRIPTION OF THE DRAWINGS

FIG. 3 is an example of vector inputs for internal and external parameters.

DETAILED DESCRIPTION OF THE PREFERRED EMBODIMENTS

The present software engine is unique in that it is designed to deal with real world events in any time interval, and predict events in succeeding time intervals. Another unique feature is that the software and hardware elements are designed as integral entities. This is different than all other computer systems where, generally, separate companies design software and hardware as separate entities.

The hardware of the present invention is structured with the Brownian motion equation, Bayes' equation and its matrices as integral components. All data are input to a common bus bar. All data are then sent to all nodes simultaneously. Each node will have coded gates to admit the proper data to the appropriate matrix and Bayes' equation. Then, as the data are processed, they will be sent to a central data processing unit that integrates the data in the Brownian motion equation. The output is displayed in linguistic terms or in digital form by means of fuzzy logic.

Although randomness is ubiquitous in the real world, there are events and entities that are constant. The diagonal of each matrix can be designated to manage these events and entities. A user can code the other positions in a matrix so that these positions can be used for events and entities that occur randomly.

All elements and entities are linked by software. This software must be able to handle all dataflow in parallel paths simultaneously. Matrices must communicate with each other in massively parallel manner. This communication requires a neural architecture. Since each element is a Bayes' equation, processing requires parallel, simultaneous communication of the elements with data stored from population data and/or data stored from past events.

Past and present software are almost exclusively sequential software. Multiple, parallel processing software in a neural network is a departure from these sequential entities. Therefore, software for this engine is written anew, or the best of sequential software is grafted/spliced together in multiple, parallel processing neural networks to accomplish this task.

The present invention allows users with their own software to utilize the software engine. There are commercially available systems that convert data in one software system to another. Fuzzy logic also allows the conversion of linguistic data to digital data and vice versa.

Another unique feature of this software engine is the integration of multiple, parallel processing in a neural network with Veitch-Karnaugh mapping. In the real world, there are numerous circumstances where events and entities are linked at varying levels. The Brownian motion equation permits prediction of changes at varying levels as well as changes in different areas within the same level. Bayes' equation permits evaluation and prediction based on past and present data. Fuzzy logic will make manipulation of linguistic and digital data possible.

Figure 1:
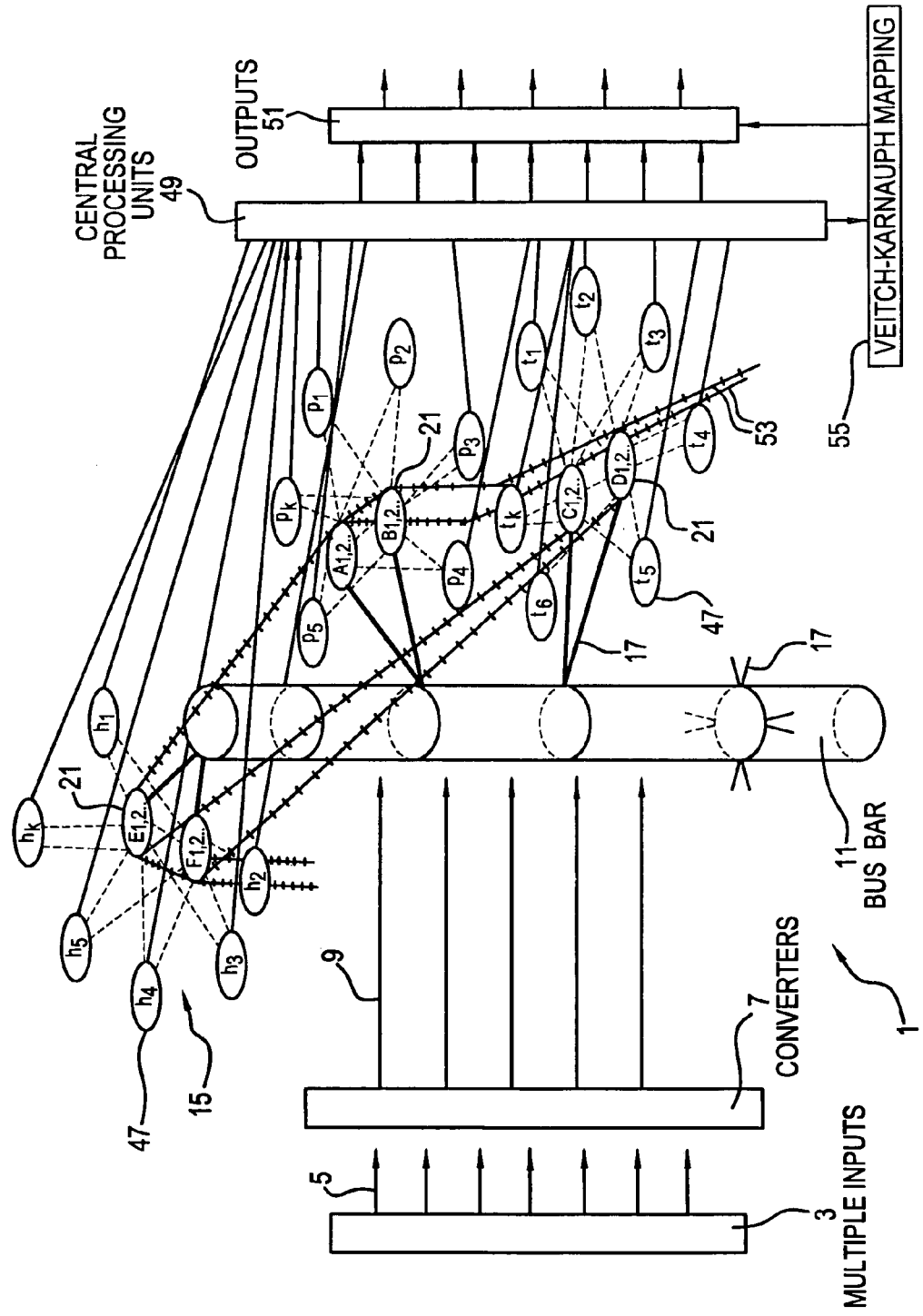
FIG. 1 is a schematic diagram of the software engine from inputs to outputs.
Figure 2:
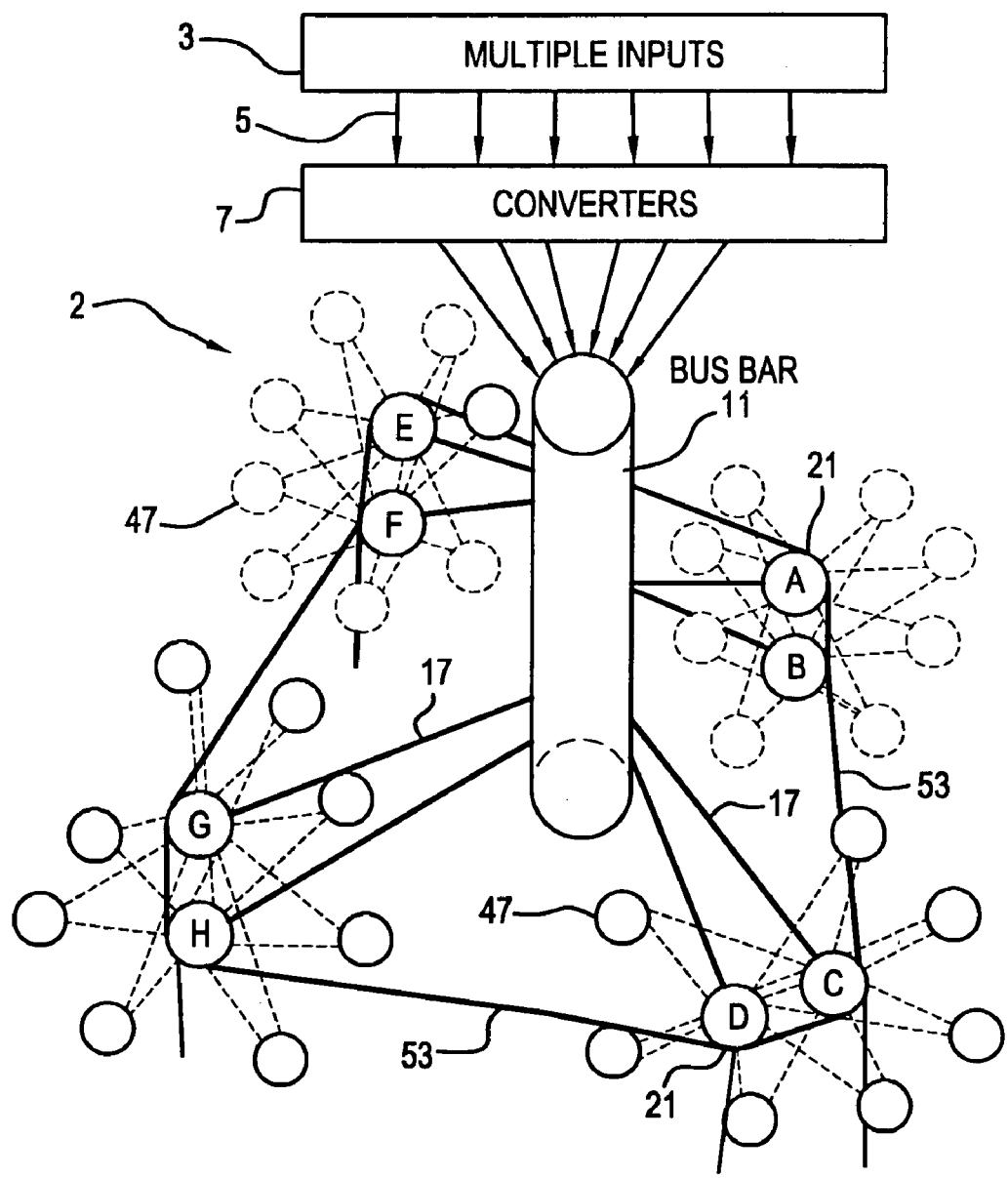
FIG. 2 is a top view schematic diagram of the software engine.

FIG. 1 illustrates the general structure of the present software engine 1. FIG. 2 shows the input part 2. Multiple inputs 3 can be fed 5 to a software converter 7 if software language is different from the specific language designed for the software engine 1. Inputs 3 in the user's language will pass through the software converter 7 without manipulation except for converting from any user's language to the language or languages chosen for the software engine 1.

A bus bar 11 is circular, around which hundreds or thousands of chips 15 are arranged. All inputs 9 go to every chip simultaneously. Each chip 15 handles about four gigabits or more of information. The heavy lines in FIG. 1 indicate the paths 17 to these primary chips 21. The primary chips 21 are designated $A_{1, 2, \ldots}$, $B_{1, 2, \ldots}$, $C_{1, 2, \ldots}$, $D_{1, 2, \ldots}$ ad infinitum. Pairing of uppercase letters indicates different levels on the circular bus bar 11. At level A, B, for example, hundreds or thousands of chips 15 can exist. However, each chip 15 is distinct and indicated by subscript numbers $A_1, A_2, A_3, A_i, + \ldots$, and $B_1, B_2, B_3, B_i, + \ldots$ These chips 15 are unique because they are the data bank of the system. The chips 15 are the foundation of a system that can cope with large randomness, expressed as:

$$P(m, n, s+1) = 1/4[P(m+1, n, s) + P(m-1, n, s) + P(m, n+1, s) + P(m, n-1, s)] \quad (1)$$

The primary chips 21 incorporate the equation 31 as though it were in virtual reality. The Brownian motion equation is split into two vectors. These vectors are m and n, as shown in Table 1 and FIG. 3. The m vector 33 embodies all factors that are internal 34 to the entity, event or situation. The n vector 35 embodies all factors that are external 36 to and have an effect on an entity, event or situation. The size of the n 35 and m 33 vectors varies according to the size and complexity of the existing problem. The size of the vectors corresponds to the size necessary to solve the problem and predict outcomes related to a specific entity or entities. The entities are open-ended to cope with unanticipated or random factors that affect the entity or entities.

Each vector is a series 41 of matrices 43 and each matrix 43 has elements 45 that are Bayes' equations. In the primary chip, the denominator of a Bayes' equation is a summation of data from a population of entities in a similar class or group, and primary chips are connected to each other by a secondary bus bar so that the denominator of a Bayes' equation can be continuously updated. Graphically, these m 33 and n 35 vectors are represented in Table 1 as follows:

TABLE 1

$$n = \text{External Factors} = \begin{bmatrix} U_{11} & \ldots & U_{1w} \\ & \ldots & \\ & \ldots & \\ & \ldots & \\ U_{v1} & \ldots & U_{vw} \end{bmatrix} + \begin{bmatrix} S_{11} & \ldots & S_{1w} \\ & \ldots & \\ & \ldots & \\ & \ldots & \\ S_{v1} & \ldots & S_{vw} \end{bmatrix} + \ldots$$

TABLE 1-continued $$n = \text{External Factors} = \begin{bmatrix} U_{11} & \ldots & U_{1w} \\ & \ldots & \\ & \ldots & \\ & \ldots & \\ U_{v1} & \ldots & U_{vw} \end{bmatrix} + \begin{bmatrix} S_{11} & \ldots & S_{1w} \\ & \ldots & \\ & \ldots & \\ & \ldots & \\ S_{v1} & \ldots & S_{vw} \end{bmatrix} + \ldots$$

Each element of a matrix is a Bayes' equation that is represented in the form:

$$P(c_i | E) = \frac{P(c_i)P(E|c_i)}{\sum_{j=1}^{S} P(c_j)P(E|c_i)} \quad (2)$$

As an example, the denominator, $$\sum_{j=1}^{S} P(c_j)P(E|c_j),$$

is a data storage bank or similar to long-term memory in a human hippocampus of the brain. The numerator, $P(c_i)P(E|c_i)$, is recent events or the equivalent of short-term memory in the human prefrontal cortex of the brain. This makes Bayes' equation a key to the Turing Machine.

The entities m, n, and Bayes' equation are located in the primary chips 21, A, B, C, . . . . Vector m 33, internal factors 34, is located in primary chips 21 A, C, E, . . . . Vector n 35, external factors 36, is located in primary chips 21 B, D, F . . . . Vectors in and n are a series 41 of matrices 43. Each matrix can be designated by the user to include factors integral with the entity and those factors that influence the entity from external sources. Data in the primary chips 21 are obtained from historical sources, data banks and population studies treated by meta analysis.

As multiple inputs 9 stream into the primary chips 21, they are matched with data already present in the chips. If they match these data, then they are manipulated in the same manner as the stored data. The stored data is located in the diagonals of each matrix. Inputs 9 that are not matched are placed in other elements of the matrix.

Once data inputs are manipulated in the primary chips 21, data are sent to secondary chips 47. The secondary chips 47 are each associated with a primary chip, such as $A_{1, 2, \ldots}$ and $B_{1, 2, \ldots}$, and are associated with $p_1, p_2, p_3, p_i, + \ldots$ Other primary chips, such as $C_{1, 2, \ldots}$ and $D_{1, 2, \ldots}$, are associated with $t_1, t_2, t_3, t_i, + \ldots$, and $E_{1, 2, \ldots}$ and $F_{1, 2, \ldots}$ are associated with $h_1, h_2, h_3, h_i, + \ldots$ In the secondary chips 47, data are placed in the appropriate matrices and Bayes' equations. The secondary chips are connected to the secondary bus bar so that the denominator of a Bayes' equation for a specific entity can be updated continuously. A secondary chip 47 has multiple loci and each loci is coded for a specific entity. After data is placed in the appropriate matrices and Bayes' equations, the stream of matrices and Bayes' equations are sent to the central processing unit 49 where they are manipulated in the Brownian motion equation. The result of this manipulation is P(m, n, s+1) displayed 51 in linguistic or digital form or a combination of these forms. The central processing unit 49 uses the Brownian motion equation and internal and external vectors that are divided into series of matrices with elements of Bayes' equation for a specific entity.

There is a secondary bus bar 53, shown in FIGS. 1 and 2, that connects the primary chips 21 at all levels. All primary chips 21, that deal with information from data banks and population studies with meta analysis or recently acquired data, have automatic updating of each Bayes' equation as determined by the coding of information bits. Loop circuits and learning algorithms make this possible.

Diagnosis of human conditions, disease or dysfunctions is an example that illustrates the architecture and operations of the present software engine. In particular, the diagnosis of hypertension shows the operation of the system. When a patient is first seen in an office, clinic or hospital, his or her vital signs or demographics are coded into the software to define the patient as a specific entity or object. Blood pressure, pulse, heart rate, physical examination findings and laboratory findings, as well as negative findings are entered into the packet of information defining the patient.

During the data generation, each bit is designated according to whether it belongs to the vector m, internal factors, or the vector n, external factors. Internal factors can include such factors as type A personality, genetics/ethnicity, diseases, such as diabetes, nephritis, hypercholesterolemia/hyperlipidemia, etc. External factors can include such factors as job stress, divorce, errant children, socio-economic problems, difficulties with police, alcohol or drug addictions, etc.

FIG. 3 shows inputting of data into the m 33 and n 35 vectors. In the primary chips 21, for vector m 33, internal factors 34 are A, C, E, . . . , and in the primary chips 21 for vector n 35, external factors 36 are B, D, F, . . . . The first data packet is processed, each component 45 of each element of a matrix is a Bayes' equation 31 and it is compared to population studies defined by meta analysis. Once these calculations are done, the packet is sent to a chip or locus, $p_1, p_1, \ldots, p_n$, in a large array that is specific for that patient. $P_1, p_1, \ldots, P_n$ receive data packets from primary chips A and B. Then the data packet is sent to the central processing unit where data are manipulated by the Brownian motion equation:

$$P(m, n, s+1)=1/4[P(m+1, n, s)+P(m-1, n, s)+P(m, n+1, s)+P(m, n-1, s)] \quad (3)$$

Where P(m, n, s+1) probability of hypertension.

This probability is treated by fuzzy logic so that it can be presented as an output in linguistic terms or digital form or a combination of both.

Figure 4:
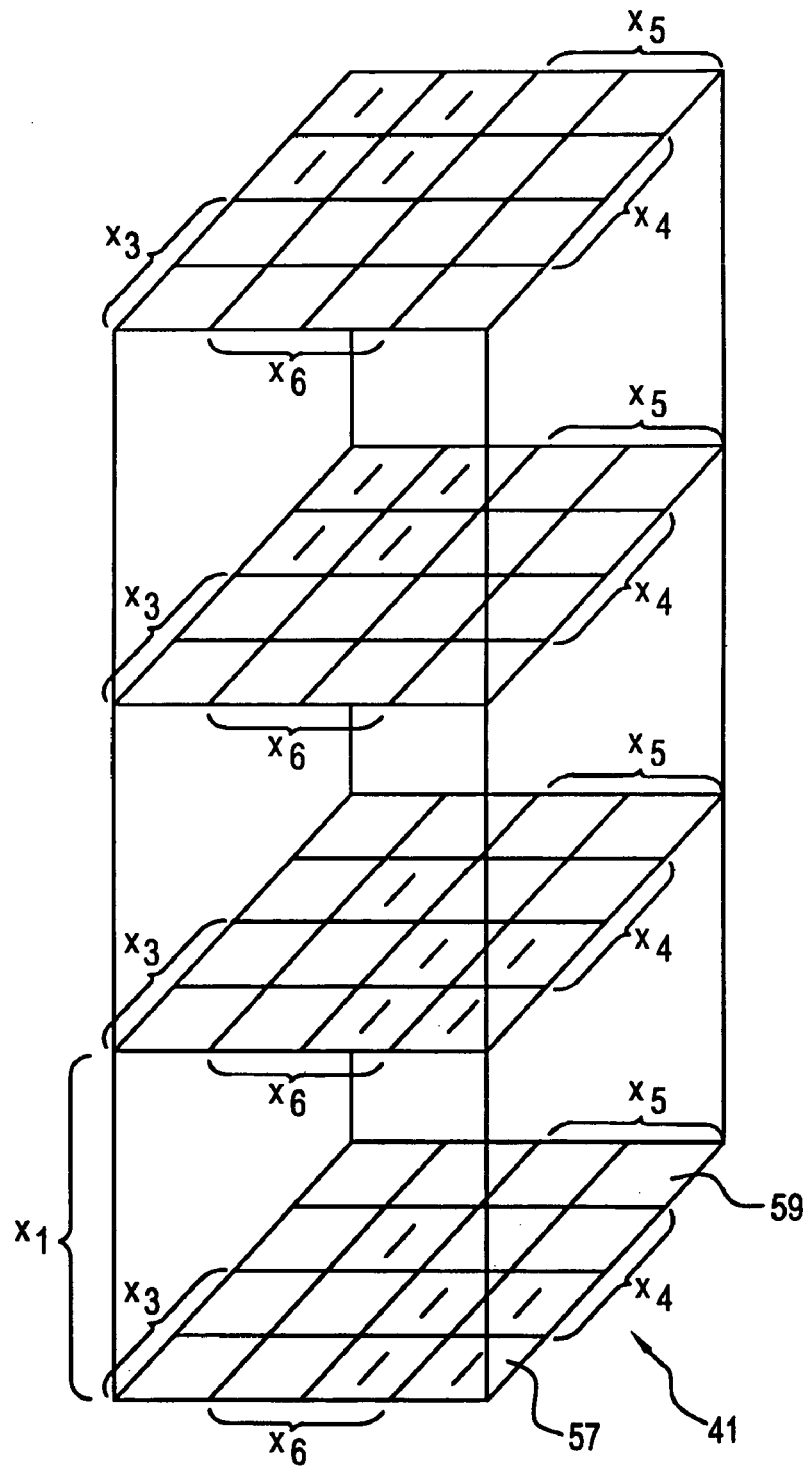
FIG. 4 is an exploded view of a matrix system.

FIG. 4 shows the hypertension example illustrating the software engine linkage to Veitch-Karnaugh mapping 55. Squares are either 0 or 1. In the illustration, the squares that do not have a one, 57, contain a value of zero, 59. The equation that expresses this particular configuration is:

$$f=\bar{x}_1\bar{x}_3\bar{x}_5 V x_1 x_3 x_5 V \bar{x}_3 x_4 \bar{x}_5 x_6 \quad (4)$$

Figure 5:
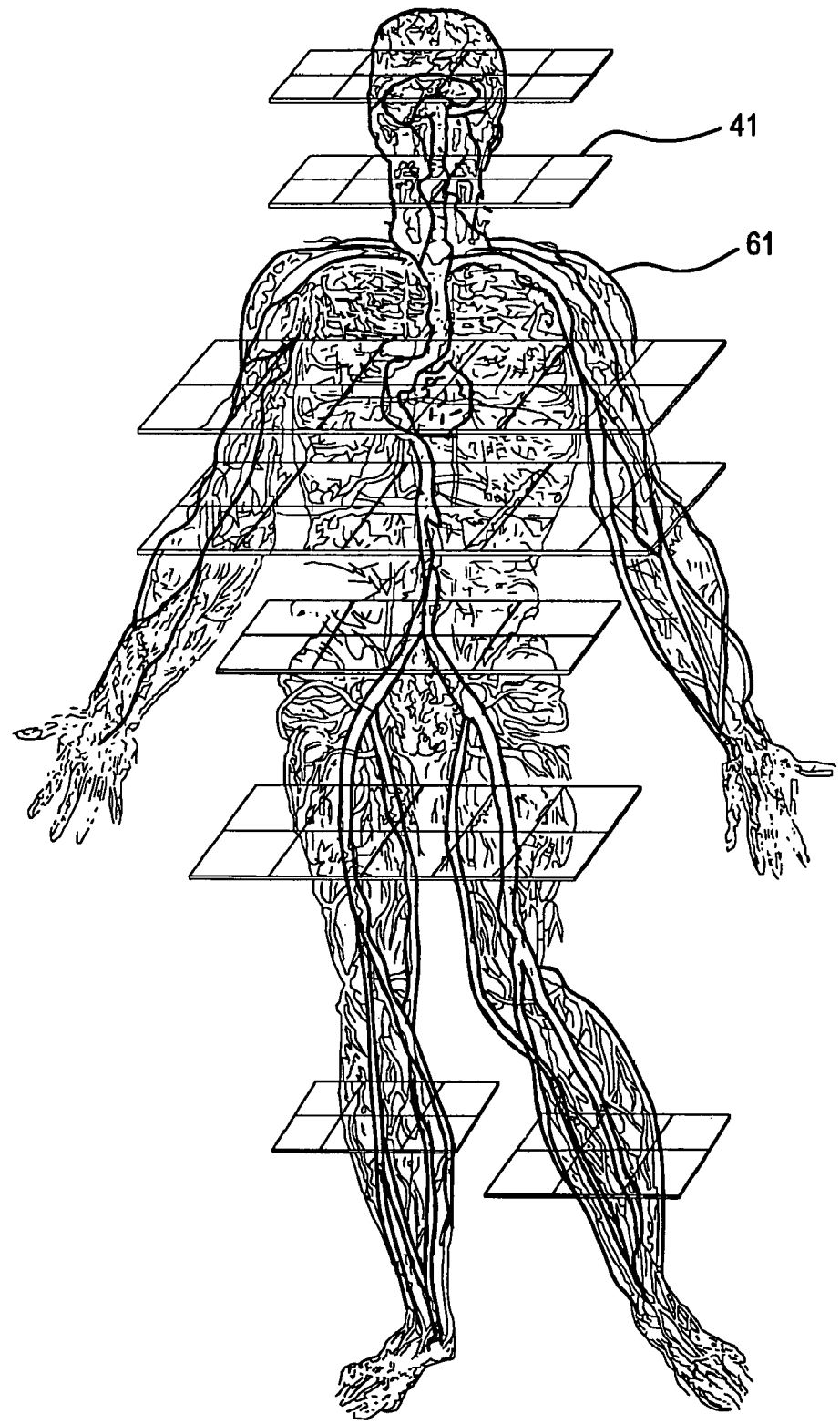
FIG. 5 is a diagram of a matrix system superimposed on a human to show how the vector information is applied to a diagnosis situation.

FIG. 5 shows the Veitch-Karnaugh 55 mapping overlaid on a human 61 to show the application of the matrix values to a real world system.

Each patient's data packet can be sent to the Veitch-Karnaugh mapping system 55 as well as the output screen 51. Here, the Brownian motion equation is used in a slightly different form from that used to diagnose hypertension. However, the patient's data packet is still utilized. Other factors, such as cardiac ejection, arterial and venous vectors, pulmonary circulation vectors, pulse pressure, etc. are also included to determine cardiovascular vectors in the system as compartmentalized by Veitch-Karnaugh mapping. The probability, P(m, n, s+1), being one in any square can be determined by fuzzy logic since the probability can be measured from 0, 0.1, 0.2, 0.3, 0.4, 0.5, 0.6, 0.7, 0.8, 0.9, and 1.0. Squares with zero can be treated similarly. Output from the Veitch-Karnaugh mapping 55 can be displayed on a Computer Assisted Design (CAD) monitor. A windows-type of display can be part of this screen that displays patient parameters.

Shortening or lengthening the bus bar 1, as shown in FIG. 1, creates modifications of the architecture. The bus bar 11 can be modularized to fit the purpose of the user and applications. The secondary bus bar 53 can also be modularized.

To build architecture for a massively parallel supercomputer, the bus bar 11 can be enlarged with a central core of liquid nitrogen. The material for the bus bar 11 will be made of a high temperature superconductor. The bus bar 11, primary 21 and secondary 47 chips, as well as central processing units 49 will be surrounded by liquid nitrogen cooling coils. The secondary bus bar 53 will also be made of high temperature super conducting materials. Massive cooling permits the use of Josephson junctions and circuits. As in the smaller computer, the bus bars can be modularized so that their lengths can be increased. In addition, many bus bars can be linked in parallel and in a neural network for a massive architecture.

The example of using this system in hypertension diagnosis, treatment and outcome is only one of many applications in many diverse fields. The following is a partial list of applications:

1. Medicine
2. Biomedical technology
3. Chemistry.
4. Drug design
5. Toxicology
6. Business management
7. Earthquake prediction
8. Biotechnology
9. Personnel selection, training and upgrading
10. Air traffic control and management
11. Global decision making
12. Domestic decision making
13. Crime prevention and detection
14. Food and water supply and demand
15. Weather prediction
16. Oil exploration
17. Environmental pollution
18. Plasma physics
19. Stock market prediction
20. Computer security
21. Aerodynamics While the invention has been described with reference to specific embodiments, modifications and variations of the invention may be constructed without departing from the scope of the invention.

I claim:

1. A method of parallel processing in a neural network system with a software engine comprising:
providing multiple inputs of data in parallel paths,
providing converters, supplying the multiple inputs of data in the parallel paths to the converters and converting data inputs in languages other than languages of the software engine to languages of the software engine, providing a primary bus and supplying the multiple inputs of data and converted inputs of data into languages of the software engine from the converters to the primary bus, providing multiple gigabit primary chips connected to the primary bus and providing the inputs of data and the converted inputs of data to the primary chips which have multiple loci for multiple classes, manipulating data through groups or sets of entities from the inputs and the converted inputs in the primary chips, manipulating data in the primary chips by means of Brownian motion equations divided into two vectors sized for solving specific problems and predicting outcomes relating to entities, providing entities that are open ended for coping with unanticipated or random factors affecting the entities, representing element of a matrix as Bayes' equation and representing the denominator of Bayes' equation as a summation of data from a population of entities in a similar class or group, connecting primary chips together for continuously updating the denominator of Bayes' equation, providing multiple secondary chips with multiple loci for specific entities connected to the primary chips, transferring the manipulated data from the primary chips to the secondary chips connected to each of the primary chips, placing the manipulated data in secondary chips which have Brownian motion equations coded for a specific entity and vectors that are a series of matrices with elements of Bayes' equation for a specific entity, providing connections between the secondary chips and a secondary bus bar for continuously updating denominators of a Bayes' equation, providing multiple loci and coding each loci for a specific entity, providing a central processor, transferring the data in matrices or Bayes' equations from the secondary chips to the central processor, providing Brownian motion equations, internal and external vectors to the central processor for evaluation of a specific entity, processing the data in the central processor by manipulating the data in the Brownian motion equations and matrices or Bayes' equations, and producing results of the manipulating from the central computer.

2. The method of claim 1, wherein all inputs pass through the converters and the bus and go to each of the primary chips simultaneously.

3. The method of claim 1, wherein the primary chips number from about several hundred to several thousand.

4. The method of claim 1, wherein the primary chips are organized into related groups of primary chips and wherein the secondary chips are connected to more than one primary chip within a group.

5. The method of claim 1, wherein the primary chips are organized into related levels of primary chips and wherein the secondary chips are connected to more than one primary chip within a level.

6. The method of claim 1, wherein the primary chips are data banks and collectively are a data bank of the system.

7. The method of claim 1, wherein the primary chips incorporate a Brownian motion equation.

8. The method of claim 7, wherein each Brownian motion equation is split into first and second vectors, the first vector embodying internal factors that are internal to an entity, event or function and the second vector embodying external factors that are external to the entity, event or function.

9. The method of claim 8, wherein each vector is a series of matrices and each matrix has elements that are Bayes' equations.

10. The method of claim 1, wherein each primary chip is distinct.

11. A method of parallel processing in a neural network system with a software engine comprising:

providing multiple inputs of data in parallel paths, supplying the multiple inputs of data in the parallel paths to converters, converting data inputs in languages other than languages of the software engine to languages of the software engine, supplying the multiple inputs of data and converted inputs of data from the converters to the bus, providing the inputs of data and the converted inputs of data to the primary chips, manipulating data from the inputs and the converted inputs in the primary chips, which communicate with each other, transferring the manipulated data from the primary chips to secondary chips, placing the manipulated data in matrices or Bayes' equations in the secondary chips, transferring the data in matrices or Bayes' equations from the secondary chips to a central processor, processing the data in the central processor by manipulating the data in Brownian motion equations and its vectors and in the matrices or Bayes' equations, and producing results of the manipulating from the central computer.

12. The method of claim 11, wherein all inputs pass through the converters and the bus and go to each of the primary chips simultaneously.

13. The method of claim 11, wherein the primary chips are gigabyte chips and number from about several hundred to several thousand.

14. The method of claim 11, wherein the primary chips are organized into related groups of primary chips, which communicate with each other, and wherein the secondary chips are connected to more than one primary chip within a group.

15. The method of claim 11, wherein the primary chips are organized into related levels of primary chips and wherein the secondary chips are connected to more than one primary chip within a level.

16. The method of claim 11, wherein the primary chips are data banks, which communicate with each other, and collectively are a data bank of the system.

17. The method of claim 11, wherein the primary chips incorporate Brownian motion equations and wherein the secondary chips organize data from the primary chips in matrices of elements and wherein each element in a matrix is a Bayes' equation.

18. The method of claim 17, wherein each Brownian motion equation is split into first and second vectors, the first vector embodying internal factors that are internal to an entity, event or function and the second vector embodying external factors that are external to the entity, event or function.

19. The method of claim 18, wherein each vector comprises a series of matrices and each matrix further comprises elements that are Bayes' equations.

20. The method of claim 1, wherein each primary chip is distinct, with multiple loci for distinct classes or groups or sets of entities.

21. A parallel processing neural network system comprising:

multiple inputs, converters connected to the multiple inputs through parallel paths, a bus connected to the converters through parallel paths, related multiple gigabyte primary chips connected to the bus and arranged in multiple groups, multiple secondary chips connected to the primary chips with each of the secondary chips connected to more than one of the primary chips, a processor having processor units connected to the secondary chips, the multiple inputs passing through the converters and the bus into the primary chips simultaneously, outputs from the secondary chips passing to the processor simultaneously, and the processor processing the outputs from the secondary chips simultaneously and producing results.

* * * * *